United States Patent
Pu

(10) Patent No.: US 9,414,304 B2
(45) Date of Patent: Aug. 9, 2016

(54) METHOD AND RELATED MOBILE DEVICE FOR CELL SEARCHING WITH LOW MEMORY REQUIREMENT

(71) Applicant: Intel IP Corporation, Santa Clara, CA (US)

(72) Inventor: Tian Yan Pu, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/661,439

(22) Filed: Mar. 18, 2015

(65) Prior Publication Data

US 2015/0282055 A1   Oct. 1, 2015

(30) Foreign Application Priority Data

Mar. 25, 2014   (DE) .......................... 10 2014 104 090

(51) Int. Cl.
*H04W 48/16* (2009.01)
*H04L 5/00* (2006.01)
*H04W 56/00* (2009.01)

(52) U.S. Cl.
CPC ............. *H04W 48/16* (2013.01); *H04L 5/0048* (2013.01); *H04W 56/00* (2013.01)

(58) Field of Classification Search
CPC ..... H04W 48/16; H04W 56/00; H04L 5/0048
See application file for complete search history.

(56) References Cited

U.S. PATENT DOCUMENTS

| | | | |
|---|---|---|---|
| 2011/0007717 A1* | 1/2011 | Swarts et al. ................. | 370/336 |
| 2012/0122453 A1* | 5/2012 | Shin et al. ..................... | 455/434 |
| 2012/0281629 A1* | 11/2012 | Zhou et al. .................... | 370/328 |
| 2013/0176991 A1* | 7/2013 | Yi ................................. | 370/336 |
| 2015/0245308 A1* | 8/2015 | Lorca Hernando .......... | 370/209 |

* cited by examiner

*Primary Examiner* — Leon Flores
(74) *Attorney, Agent, or Firm* — Schiff Hardin LLP

(57) ABSTRACT

The present solution relates to a method for searching for a cell in a cellular mobile communication system having low memory requirement. The method comprises: receiving in a receiver a signal carrying a reference signal having a first data rate, decimating the signal to generate a down-sampled signal having a second data rate, phase-compensating a phase distortion introduced by the decimating, and correlating the down-sampled signal against a phase-compensated local reference signal or a phase-compensated down-sampled signal against a local reference signal. When buffering the down-sampled signal prior or subsequent to phase-compensating, the buffer size is minimized as 1× oversampling is employed compared to 2× oversampling of current solutions.

21 Claims, 4 Drawing Sheets

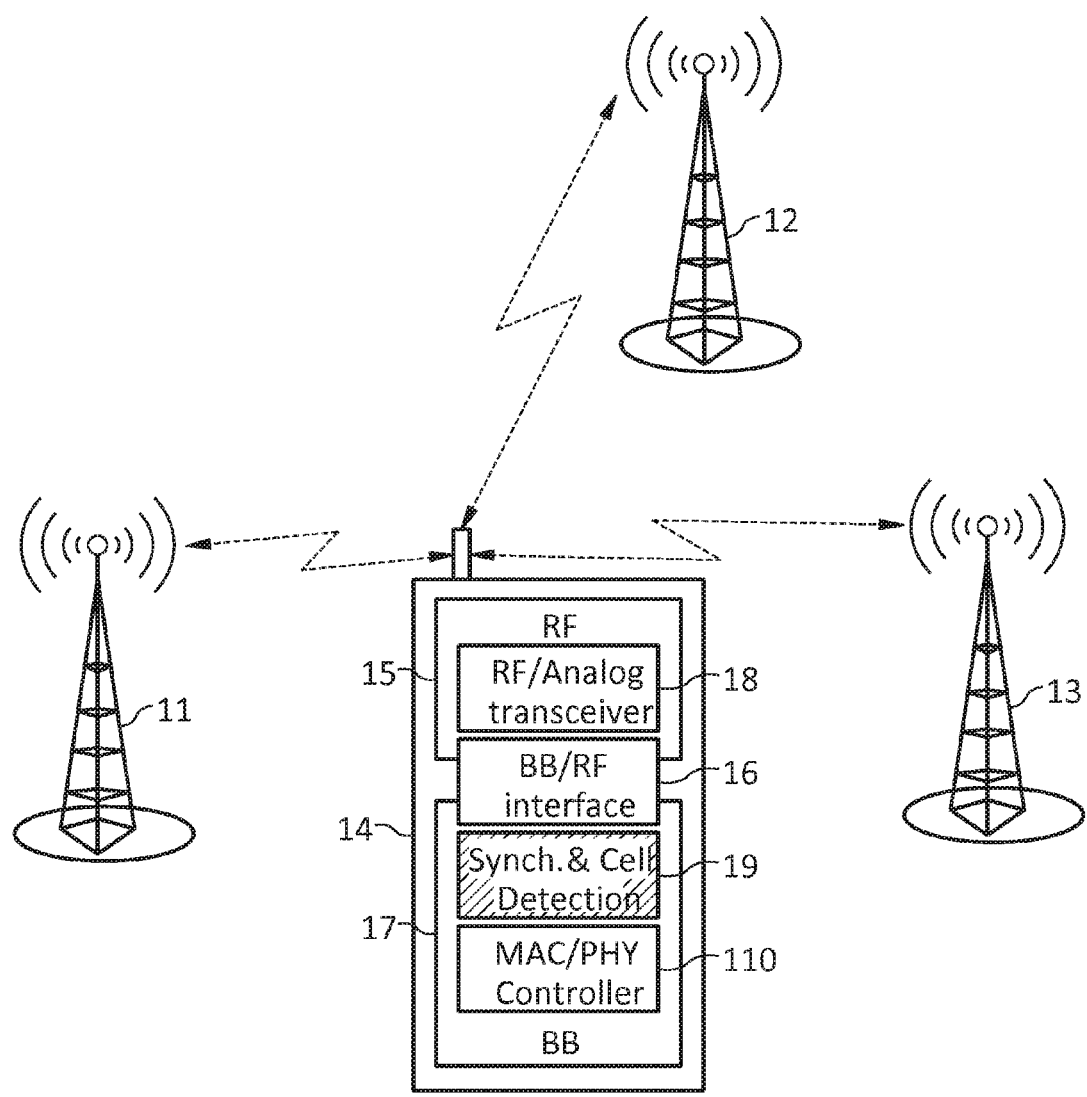

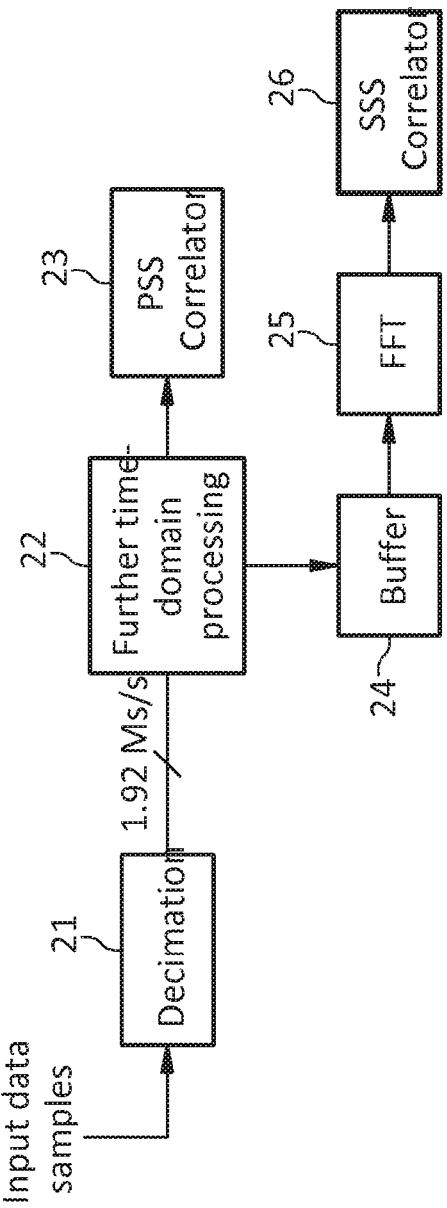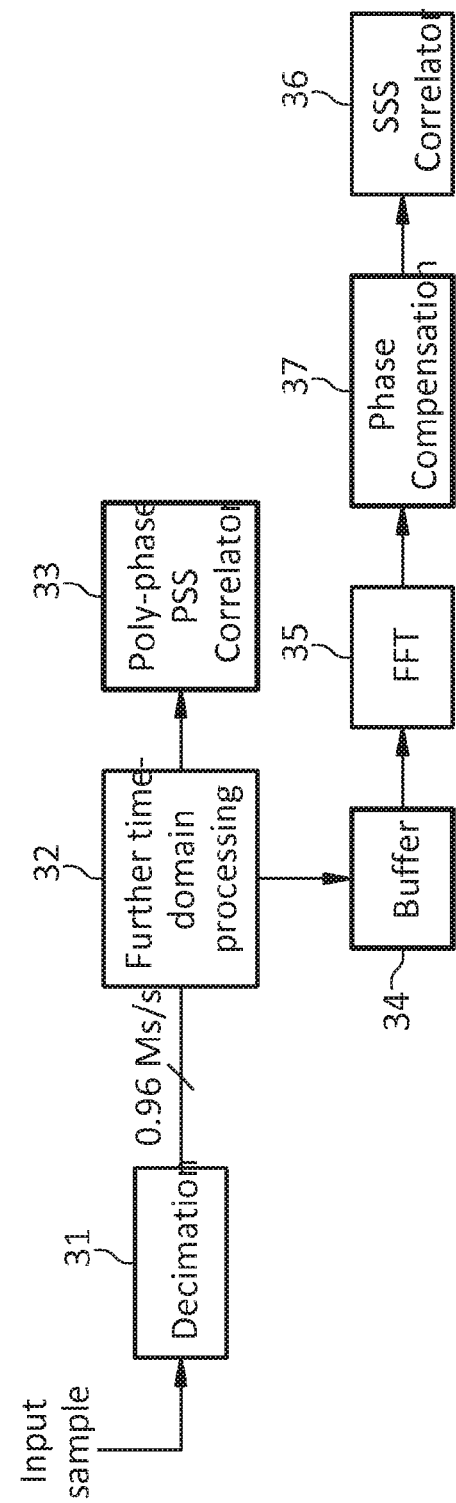

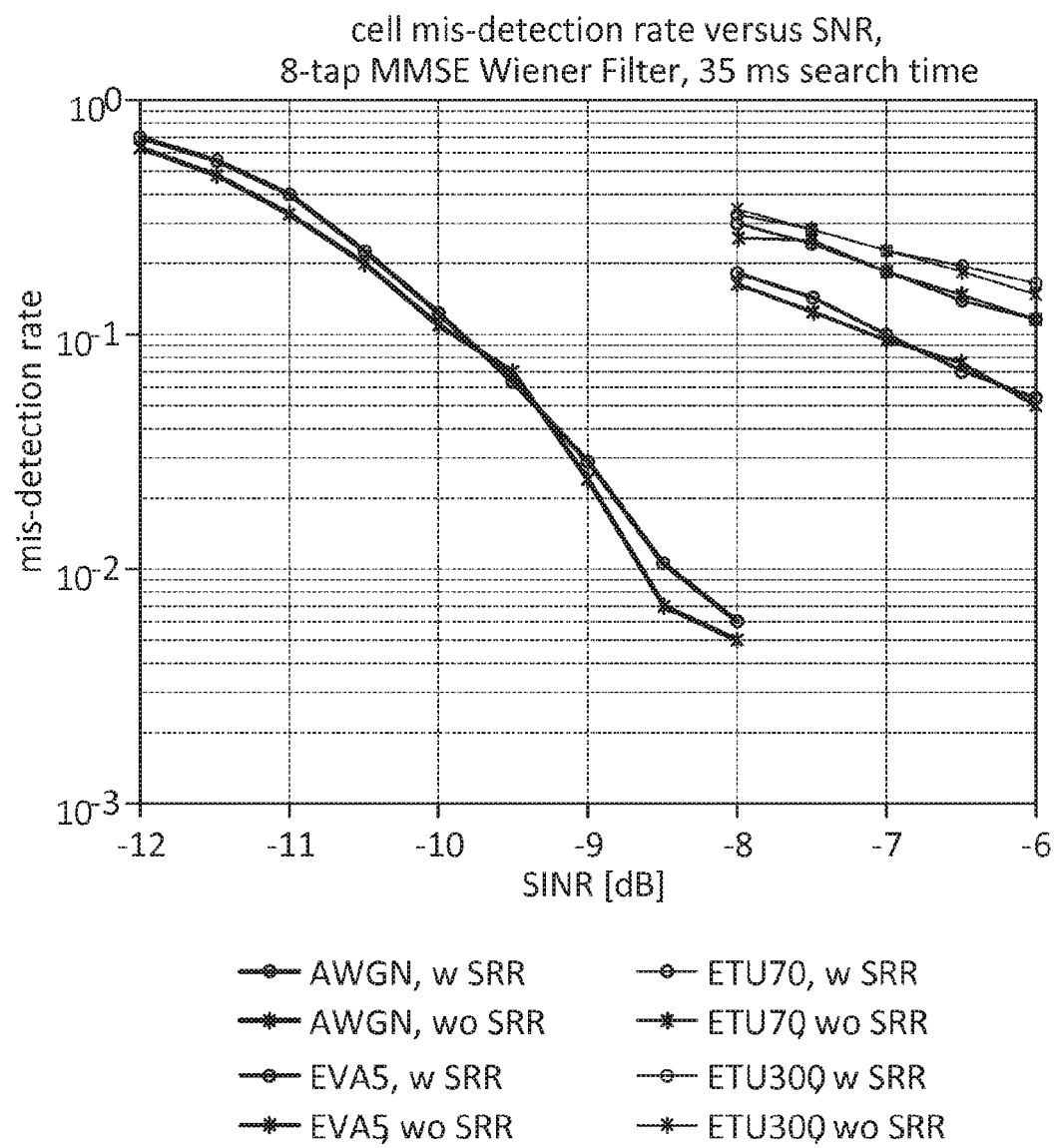

METHOD AND RELATED MOBILE DEVICE FOR CELL SEARCHING WITH LOW MEMORY REQUIREMENT

FIELD OF THE INVENTION

The present invention relates to a method and related mobile device for cell searching with low memory requirement. The present invention specifically relates to a method and related mobile device for cell searching with low memory requirement in a Long Term Evolution (LTE) system.

BACKGROUND OF THE INVENTION

Cell search/detection is an important procedure for a mobile device deployed in a cellular network. Typically, reference signals are used to identify a cell which needs to be detected by the mobile device during operation. Reference signals are data symbols which are known at the receiver and are used for parameter estimation tasks, e.g. cell-identity (cell-ID) detection.

In a cellular network, a supplied area is split into cells, each cell being equipped with a base station which serves the mobile stations in that cell. Each cell needs to be uniquely identified if a mobile devices wishes to connect to a cell or if the mobile device is already connected to a cell and wishes to connect to another cell. For this purpose a base station transmits a cell identity (cell-ID) within the Primary Synchronization Signal (PSS) and Secondary Synchronization Signal (SSS). There are 504 unique physical layer cell identities in LTE, grouped into 168 groups of three identities. Three PSS sequences are used to indicate the cell identity within the group and 168 SSS sequences are used to indicate the identity of the group.

In the mobile device, in order to enable reliable data reception, a number of parameter estimation tasks need to be performed, e.g., time synchronization estimation, frequency synchronization estimation, channel estimation, interference level estimation, Doppler spread estimation, power delay profile estimation, feedback information estimation. PSS detection is used for slot timing detection and physical layer ID detection. SSS detection is used for radio frame detection, cyclic prefix (CP) length detection and TDD/FDD detection. SSS detection is based on coherent demodulation in frequency domain.

Present solutions employ oversampling during reference signal detection, for example 2x oversampling during PSS detection and SSS detection in order to achieve good cell search sensitivity.

There are some obvious draw backs associated with 2x oversampling rate processing. With 2x data to be processed, more dynamic power is consumed at silicon side. Moreover, much more hardware resources are required with 2x data, leading to more hardware cost and more leakage power. This is especially true for memory requirement, which usually is the dominant part for hardware cost in cell searcher design.

Hence, what is needed is a solution for cell searching having low memory requirement.

DISCLOSURE OF THE INVENTION

This solution is achieved with a method according to the independent method claim and a related mobile device according to the independent apparatus claim. The dependent claims relate to further aspects of the present solution.

BRIEF DESCRIPTION OF THE DRAWINGS

The method and related mobile device according to the invention are described in more detail herein below by way of exemplary embodiments and with reference to the attached drawings, in which:

FIG. 1 shows a block diagram of a mobile device in a mobile communication system;

FIG. 2 shows a current solution block diagram of PSS and SSS detection;

FIG. 3 shows a block diagram of a first version of PSS and SSS detection with low memory requirement;

FIG. 6 shows a diagram showing a comparison of a cell misdetection rate versus a signal to interference and noise ratio for a cell search with sample rate reduction versus a cell search without sample rate reduction.

DETAILED DESCRIPTION OF THE INVENTION

Figure 4:
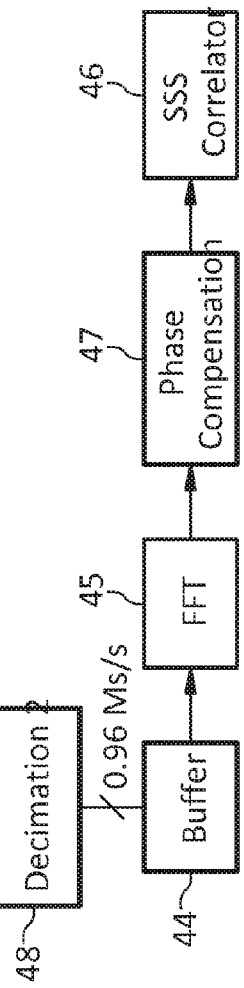
FIG. 4 shows a block diagram of a second version of PSS and SSS detection with low memory requirement.

FIG. 1 shows a mobile communication system comprising three base stations 11, 12, 13 and a mobile device 14. When powering up the mobile device 14 has no knowledge about the deployment of the base stations 11, 12, 13, hence the number of cells surrounding the mobile device 14. If the mobile device 14 wishes to attach to a cell the mobile device 14 performs an initial cell search procedure. The initial cell search procedure requires detecting reference signals, possibly comprising further reference sub-signals like PSS and SSS, and is part of the baseband processing performed in the baseband processing module 17, specifically in the synchronization and cell detection module 19. The mobile device further comprises a radio frequency module 15 including a radio frequency/analog transceiver 18 for acquiring radio samples. Radio samples are transferred from the radio frequency (RF) module 15 to the base band (BB) processing module 17 via BB/RF interface 16. The Mac/Phy controller 110 may request the synchronization and cell detection module 19 to perform the cell search.

FIG. 2 shows a current solution block diagram of a cell search detection procedure in a mobile communication system such as an LTE system as performed by the synchronization and cell detection module 19 as shown in FIG. 1. Radio samples are passed to decimator stage 21 to down-sample the data rate to for example 1.92 Ms/s. Some further time domain processing 22 can be applied before data enters PSS correlator 23, which is responsible for detecting PSS peaks. After further time domain processing stage 22, data is stored in a buffer 24 at the same time as or after PSS peak detection depending on implementation and operation mode (e.g. offline processing or real-time processing mode). Based on the detected PSS peak positions, part of the buffered data is picked out from buffer 24 and transformed via FFT into frequency domain by FFT stage 25, where SSS detection is carried out in SSS correlator 26. Alternatively, as shown in dotted line in the figure, the buffered data in buffer 24 can be passed to PSS correlator 23 instead of real-time data. The data rate of 1.92 Ms/s after decimator stage 21 represents a 2x oversampling with respect to a required data rate to perform PSS and SSS detection. Hence, the buffer 24 has a size to accommodate data sampled with 2x oversampling. The present solution aims to reduce the size of the buffer by further reducing the sampling rate, for example to 1x oversampling.

The present solution relates to a method for searching for a cell in a cellular mobile communication system, the method comprising: receiving in a receiver a signal carrying a reference signal having a first data rate, decimating the signal to generate a down-sampled signal having a second data rate, compensating a phase distortion introduced by the decimating, and correlating the down-sampled signal against a phase-compensated local reference signal or a phase-compensated down-sampled signal against a local reference signal. The second data rate is lower than the first data rate. The second data rate may be a lowest sample rate to obtain a pre-defined accuracy of the method, e.g. 1× oversampling. Phase compensation is necessary due to a phase distortion introduced by a low pass filter associated with decimation in order to fulfil the sampling rate theorem. Compensating a phase distortion may comprise pre-compensating, i.e. offline pre-computing, the reference signal to generate the phase-compensated local reference signal against which the down-sampled signal is correlated against, specifically when using a poly-phase correlator, for example a two phase correlator.

Alternatively, compensating a phase distortion may comprise phase-compensating the down-sampled signal either in time domain or in frequency domain to generate the phase-compensated down-sampled signal used for correlating against the local reference signal being identical to the reference signal.

When buffering the down-sampled signal prior or subsequent to compensating, the buffer size is minimized. With buffering the down-sampled signal, the RF module can be switched off which significantly saves modem power.

FIG. 3 shows a block diagram of a first version of the method implemented in the synchronization and cell detection module 19 of FIG. 1. After receiving a signal carrying a reference signal comprising a first reference sub-signal, i.e. a PSS, and a second reference sub-signal, i.e. a SSS, the decimator 31 decimates the signal to generate a down-sampled signal with a data rate of 0.96 Ms/s at the output of decimator 31. Then, further time domain processing takes place in stage 32. The buffer 34 buffers the down-sampled signal. Compensating in time domain a phase distortion introduced by the decimating comprises pre-compensating the first reference sub-signal, i.e. the PSS, to generate a first local reference signal, i.e. a pre-compensated local PSS reference signal. The poly-phase PSS correlator 33 with the pre-compensated local PSS reference signal for PSS peak detection poly-phase-correlates in time domain the down-sampled signal against the first local reference sub-signal, i.e. the PSS. FFT stage 35 transforms the down-sampled signal stored in buffer 34 from time domain to frequency domain. Phase compensation stage 37 compensates in frequency domain a phase distortion introduced by the decimating by compensating a phase distortion of the down-sampled signal to generate a phase-compensated down-sampled signal. SSS correlator 36 correlates in frequency domain the phase-compensated down-sampled signal against a second local reference sub-signal, i.e. a local SSS, being identical to the second reference sub-signal. Phase compensation after FFT stage 35 minimizes the performance loss due a utilization of a 1× sampling rate. The 1× sampling rate reduces the buffer by half compared to current solutions. This results in savings in silicon area and power consumption.

For an LTE system, current solutions use 2× sampling data to make sure the PSS peak detection sensitivity is not sacrificed. It was shown that up to 2~3 dB performance loss could be there if brute force 1× sample rate is used compared to use of 2× sampling rate. With the present solution, however, a poly-phase PSS correlator with pre-compensated local PSS sequences is provided so that almost an equivalent performance can be achieved with 1× sampling.

The time domain signal decimated to 0.96 Ms/s of half-frame p is denoted as y(n,p). During PSS detection, the PSS correlator computes a correlation metric $\Lambda_r$ based on sector ID hypothesis r $$\Lambda_r(2n+u,p)=\Sigma_{l=0}^{L-1}|\Sigma_{k=0}^{N-1}y(n-(l*N+k),p)*s_{u,r}*(l*N+k)-1)| \quad (1)$$

where $s_{u,r}$ is complex conjugate of time domain pre-compensated PSS sequence with sector ID r (r∈0, 1, 2 according to 3GPP spec.) and phase (u∈0, 1, 2), L is the number of data segments used for PSS correlation, N is the number of samples per data segment within which coherent combining is used as shown in Eq. 1.

$s_{u,r}$ is generated based on 3GPP specified PSS sequence and frequency response of decimator as follows:

$$s_r=\text{IFFT}128(P_r*\text{conj}(D)) \quad (2)$$

$$s_{u,r}=s_r(2n+u), u=0,1, n=0\ldots 63 \quad (3)$$

where $P_r$ is the frequency domain PSS sequence with sector ID r and D is the frequency response of decimator at the frequency range of the PSS sequence. Note that pre-compensation of decimator frequency response is important here since the decimator normally introduces a phase distortion at the edge of a band where PSS sequence is located. With pre-compensation of the local PSS reference sequence, the PSS detector works like a matched filter and thus minimizes the performance loss.

From $\Lambda_r$ the final PSS peak detection metric can be generated by accumulating or performing special low cost combining over a number of half-frames. For instance in case accumulating, one or several peaks can be obtained over $P_{observ}$ half-frames as shown in Eq. 4.

$$\tilde{r}=\text{argmax}_{u,r,n}\Sigma_{p=0}^{P_{observ}-1}\Lambda_r(2n+u,p) \quad (4)$$

Phase compensation is required before frequency domain SSS detection for two reasons. The first reason is due to the phase distortion introduced by the decimator at the edge of the center 0.96 Mhz band where the PSS sequence is located, i.e. for the same reason as why pre-compensated PSS sequences are required. The second reason is due to the fact that the start position offset of PSS and SSS sequence can be M+0.5 samples at 0.96 Ms/s sample rate, where M can be easily taken care of when data is picked out from the buffer. However, the remaining 0.5 sample effect needs to be compensated ideally for following SSS detection. This can be done after FFT with linear phase compensation over sub-carriers. An aggregate phase, i.e. sum of a linear phase due to the 0.5 sample offset and a pre-compensated phase due to the decimation filter response, can be computed offline and compensation is done once per SSS hypothesis. An alternative to compensate the linear phase due to 0.5 sample offset can be zero-padding in time domain and utilization of a 128 point FFT.

FIG. 4 shows a block diagram of a second version of the method implemented in the synchronization and cell detection module 19 of FIG. 1. After receiving a signal carrying a reference signal comprising a first reference sub-signal, i.e. a PSS, and a second reference sub-signal, i.e. a SSS, the decimator 41 decimates the signal to generate signal with a data rate of 1.92 Ms/s which corresponds to 2× oversampling. Then, further time domain processing takes place in stage 42. The PSS correlator 43 works with 2× oversampling and correlates in time domain the signal against a first local reference sub-signal, i.e. a local PSS, being identical the first reference sub-signal, i.e. the PSS. Following stage 42, decimator 48 decimates the signal with a data rate 1.92 Ms/s to generate a down-sampled signal with a data rate of 0.96 Ms/s. The buffer 44 buffers the down-sampled signal. FFT stage 45 transforms the down-sampled signal stored in buffer 44 from time domain to frequency domain. Phase compensation stage 47 compensates in frequency domain a phase distortion introduced by the decimating by compensating a phase distortion of the down-sampled signal to generate a phase-compensated down-sampled signal. SSS correlator 46 correlates in frequency domain the phase-compensated down-sampled signal against a second local reference sub-signal, i.e. a local SSS, being identical to the second reference sub-signal, i.e. the SSS. With 1× data sampling, the biggest benefit comes from reduction in buffer size as discussed above. Therefore, within the second version of the method the sample rate is reduced to 0.96 Ms/s only along the SSS detection path as shown FIG. 4. Compared to the first version shown in FIG. 3, the second version still reaps most of benefits from 1× data sampling due to the same reduction in memory size it can achieve.

Figure 5:
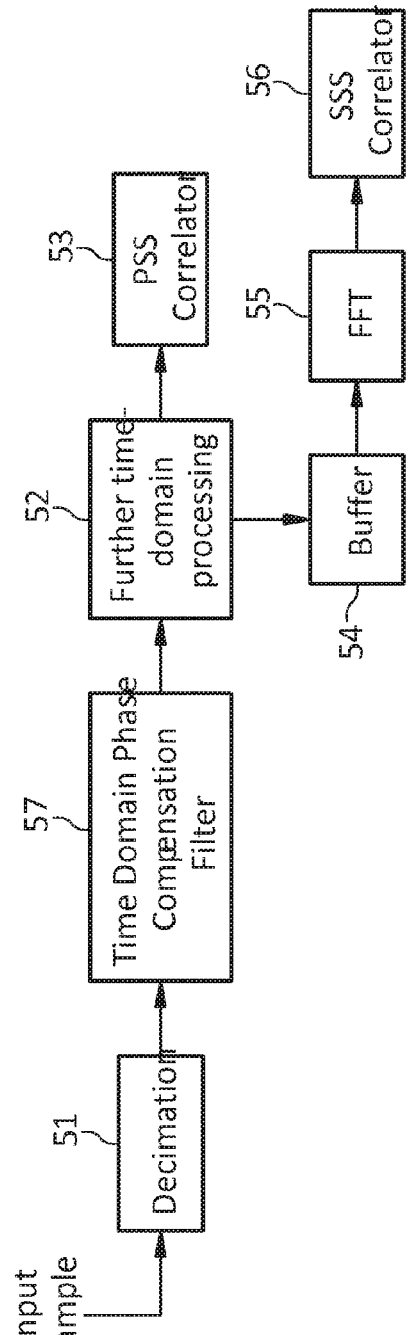
FIG. 5 shows a block diagram of third version of PSS and SSS detection with low memory requirement.

FIG. 5 shows a block diagram of a third version of the method implemented in the synchronization and cell detection module 19 of FIG. 1. After receiving a signal carrying a reference signal comprising a first reference sub-signal, i.e. a PSS, and a second reference sub-signal, i.e. a SSS, the decimator 51 decimates the signal to generate a down-sampled signal with a data rate of 0.96 Ms/s which corresponds to 1× oversampling. The time domain phase compensation filter 57 compensates in time domain a phase distortion introduced by the decimating to generate a phase-compensated down-sampled signal. Then, further time domain processing takes place in stage 52. The PSS correlator 53 correlates in time domain the signal against a first local reference sub-signal, i.e. a local PSS, being identical the first reference sub-signal, i.e. the PSS. Following further time domain processing in stage 52, the buffer 54 buffers the down-sampled signal. FFT stage 55 transforms the down-sampled signal stored in buffer 54 from time domain to frequency domain. SSS correlator 56 correlates in frequency domain the phase-compensated down-sampled signal against a second local reference sub-signal, i.e. a local SSS, being identical to the second reference sub-signal, i.e. the SSS. Thus, all phase-compensating takes place in time domain within the third version.

As shown above, the present solution specifically provides a 1× sampling processing in an LTE system for both PSS detection and SSS detection to achieve low cost and low power design. DSP processing techniques are applied in order to make the sensitivity loss due to one times sampling rate processing almost negligible. During PSS detection, 1× sampled data is utilized and a poly-phase correlator with pre-compensated filter coefficients in time domain may be applied. During SSS detection, 1× sampled data is utilized and phase/half sample compensation in frequency domain may be applied.

The present solution offers almost equivalent performance compared to current solutions while it reduces hardware cost and power consumption significantly as will be explained for an offline processing mode and an online processing mode.

Due to the use of 1× sampling rate, the memory buffer requirement is halved. In any cell search implementation, the memory buffer is typically used to buffer the input data during various cell search modes. With a memory buffer present, the RF circuit can be switched off which greatly saves modem power as radio samples can be stored in the memory buffer. The stored radio samples can be utilized during SSS detection.

During offline processing mode, data is buffered into memory for later SSS detection when searcher still operates PSS detection. Apparently, this requires a large buffer to store data. For example, a memory with size of 153.6K bytes is needed in order to store 20 millisecond data, assuming a two times sampling rate, 8 bit precision and 2 receive antennas. The memory requirement can be reduced to 76.8 Kbytes with one times sampling rate as proposed with the present solution. This is very important not only from silicon area point of view, but also from power consumption point of view, since memory leakage power is an important design metric to optimize. With less memory required as proposed in this invention with 1× data sampling, less leakage and less silicon area can be achieved. Real-time processing mode is another example.

In online operations mode, during SSS processing, data is buffered and then picked out for further processing based on peak positions detected at PSS detection step. For continuous operation in order to achieve better searcher sensitivity, a ping pong buffer with size of 10 ms is required. In case of carrier aggregation and simultaneous searching over a number of carriers, the buffer requirements are linearly increased with carrier number. For example in case of 3 carrier aggregation, totally 30 ms data needs to be buffered when searching over 3 carriers simultaneously. Apparently, one time sampling rate buffering with the present solution requires half memories ideas 2× sampling rate (e.g. 115.2 Kbytes versus 230.4 Kbytes).

Not only memory area and its associated power consumption, but also logic area and its associated power consumption can be reduced, since data sample rate is reduced to one time right after decimation, which is a first stage in a search processing chain, as will be shown in detailed description of invention.

FIG. 6 shows the simulation results over all different channel conditions for current solution two times sampling rate solution and present solution (i.e. one time sampling rate). Compared with 2× sample rate results (curves with star), the performance loss due to utilization of 1× sampled data (curves with circle) is very marginal and well acceptable.

The present solution further relates to a mobile device comprising means for receiving a signal carrying a reference signal having a first data rate, means for decimating the signal to generate a down-sampled signal having a second data rate, means for compensating a phase distortion introduced by the decimating, and means for correlating the down-sampled signal against a phase-compensated local reference signal and means for correlating a phase-compensated down-sampled signal against a local reference signal or the down-sampled signal against a phase-compensated local reference signal.

The present solution further relates to a computer-readable medium having computer-executable instructions for performing the method.

The invention claimed is:

1. A method for searching for a cell in a cellular mobile communication system, the method comprising: receiving in a receiver a signal carrying a reference signal having a first data rate, decimating the signal to generate a down-sampled signal having a second data rate, compensating a phase distortion introduced by the decimating step to generate a phase-compensated down-sampled signal, and correlating the down-sampled signal against a phase-compensated local reference signal or the phase-compensated down-sampled signal against a local reference signal.

2. The method according to claim 1, the method further comprising:
buffering the down-sampled signal prior or subsequent to compensating a phase distortion.

3. The method according to claim 1, wherein compensating a phase distortion comprises pre-compensating the reference signal to generate the phase-compensated local reference signal.

4. The method according to claim 1, wherein correlating the down-sampled signal against a phase-compensated local reference signal comprises using a poly-phase correlator.

5. The method according to claim 1, wherein correlating the down-sampled signal against a phase-compensated local reference signal comprises using a two-phase correlator.

6. The method according to claim 1, wherein compensating a phase distortion comprises compensating a phase distortion of the down-sampled signal either in time domain or in frequency domain to generate the phase-compensated down-sampled signal.

7. The method according to claim 1, the method comprising:
receiving a signal carrying a reference signal, the reference signal comprising a first reference sub-signal and a second reference sub-signal;
decimating the signal to generate a down-sampled signal;
buffering the down-sampled signal;
compensating in time domain a phase distortion introduced by the decimating by pre-compensating the first reference sub-signal to generate a first local reference signal;
poly-phase correlating in time domain the down-sampled signal against the first local reference sub-signal;
compensating in frequency domain a phase distortion introduced by the decimating by compensating a phase distortion of the down-sampled signal to generate a phase-compensated down-sampled signal; and
correlating in frequency domain the phase-compensated down-sampled signal against a second local reference sub-signal being identical to the second reference sub-signal.

8. The method according to claim 1, the method comprising:
receiving a signal carrying a reference signal, the reference signal comprising a first reference sub-signal and a second reference sub-signal;
correlating in time domain the signal against a first local reference sub-signal being identical the first reference sub-signal;
decimating the signal to generate a down-sampled signal;
buffering the down-sampled signal;
compensating in frequency domain a phase distortion introduced by the decimating by compensating a phase distortion of the down-sampled signal to generate a phase-compensated down-sampled signal; and
correlating in frequency domain the phase-compensated down-sampled signal against a second local reference sub-signal being identical to the second reference sub-signal.

9. The method according to claim 1, the method comprising:
receiving a signal carrying a reference signal, the reference signal comprising a first reference sub-signal and a second reference sub-signal;
decimating the signal to generate a down-sampled signal;
buffering the down-sampled signal;
compensating in time domain a phase distortion introduced by the decimating by compensating a phase distortion of the down-sampled signal to generate a phase-compensated down-sampled signal;
correlating in time domain the phase compensated down-sampled signal against a first local reference sub-signal being identical to the first reference sub-signal; and
correlating in frequency domain the phase-compensated down sampled signal against a second local reference sub-signal being identical to the second reference sub-signal.

10. The method according to claim 7, wherein the first reference sub-signal is a primary synchronization signal (PSS) of a Long Term Evolution (LTE) system and wherein the second reference sub-signal is a secondary synchronization signal (SSS) of the LTE system.

11. The method according to claim 10, wherein compensating in frequency domain a phase distortion comprises further compensating a phase distortion due to a 0.5 sample offset between PSS and SSS.

12. The method according to claim 11, wherein compensating a phase distortion comprises pre-computing an aggregate phase as a sum of a linear phase due to the 0.5 sample offset between PSS and SSS and a pre-compensated phase due to the decimating and compensating a phase distortion once per SSS hypothesis using the aggregate phase.

13. The method according to claim 12, wherein phase-compensating a 0.5 sample offset between PSS and SSS comprises zero-padding in time domain and applying a 128 point FFT when transforming from time domain to frequency domain.

14. The method according to claim 1, wherein the second data rate is lower than the first data rate and wherein the second data rate is a lowest sample rate to obtain a pre-defined accuracy of the method.

15. The method according to claim 1, wherein the second data rate is 0.96 Ms/s.

16. The method according to claim 1, wherein the first data rate is 1.92 Ms/s.

17. A mobile device comprising: means for receiving a signal carrying a reference signal having a first data rate, means for decimating the signal to generate a down-sampled signal having a second data rate, means for compensating a phase distortion introduced by the decimating to generate a phase-compensated down-sampled signal, and means for correlating the down-sampled signal against a phase-compensated local reference signal, and means for correlating the phase-compensated down-sampled signal against a local reference signal or the down-sampled signal against a phase-compensated local reference signal.

18. The mobile device according to claim 17, the mobile device further comprising means for buffering the down-sampled signal prior or subsequent to phase-compensating.

19. The mobile device according to claim 18, the mobile device comprising:
a receiver for receiving a signal carrying a reference signal comprising a PSS and a SSS; and
a synchronization and cell detection module comprising:
a decimator for decimating the signal;
a time domain processing stage connected to the decimator;
a poly-phase PSS-correlator connected to the time domain processing stage for correlating a decimated signal against a pre-compensated PSS;
a buffer connected to the time domain processing stage;
a Fast Fourier Transform (FFT) stage for transforming the decimated signal from time domain to frequency domain connected to the buffer;
a phase-compensation stage connected to the FFT stage for compensating in frequency domain a phase distortion of the decimated signal; and
a SSS correlator connected to the phase-compensation stage for correlating a phase-compensated down-sampled signal against the SSS.

20. The mobile device according to claim 18, the mobile device comprising:
- a receiver for receiving a signal carrying a reference signal comprising a PSS and a SSS; and
- a synchronization and cell detection module comprising:
  - a time domain processing stage for processing the signal;
  - a PSS for correlating the signal against the PSS;
  - a decimator for decimating the signal;
  - a buffer connected to the decimator;
  - a Fast Fourier Transform (FFT) stage for transforming the decimated signal from time domain to frequency domain;
  - a phase-compensation stage connected to the FFT stage for compensating in frequency domain a phase distortion of the decimated signal; and
  - a SSS correlator connected to the phase-compensation stage for correlating a phase-compensated down-sampled signal against the SSS.

21. A non-transitory computer readable medium having computer-executable instructions for performing the method according to claim 1.

* * * * *